G. T. BUXTON & S. A. ABBEY.
FILTRATION DEVICE FOR FLUID DISTRIBUTING SYSTEMS.
APPLICATION FILED JULY 23, 1915.
1,226,307.
Patented May 15, 1917.
2 SHEETS—SHEET 1.
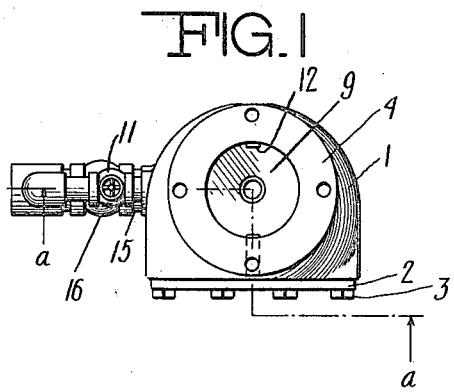
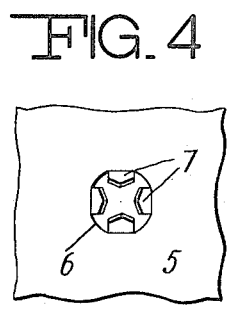
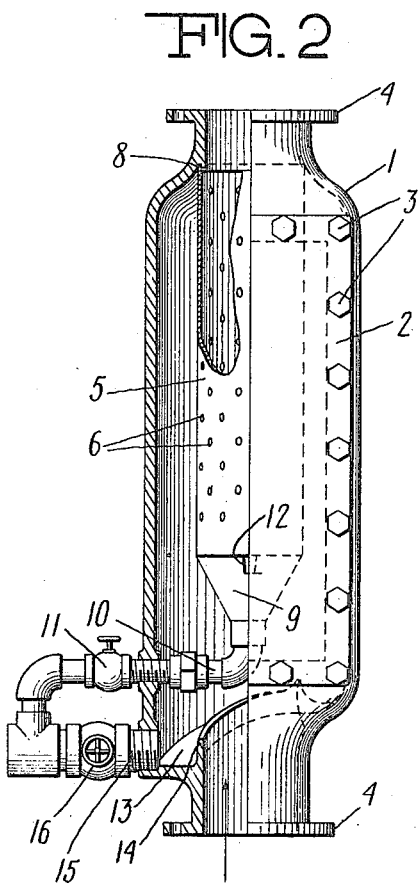
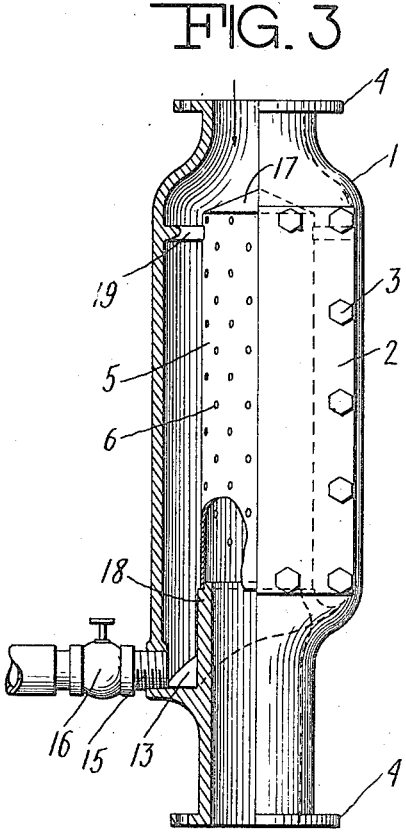
INVENTORS,
Gustavus T Buxton
Simeon A Abbey
BY
ATTORNEY

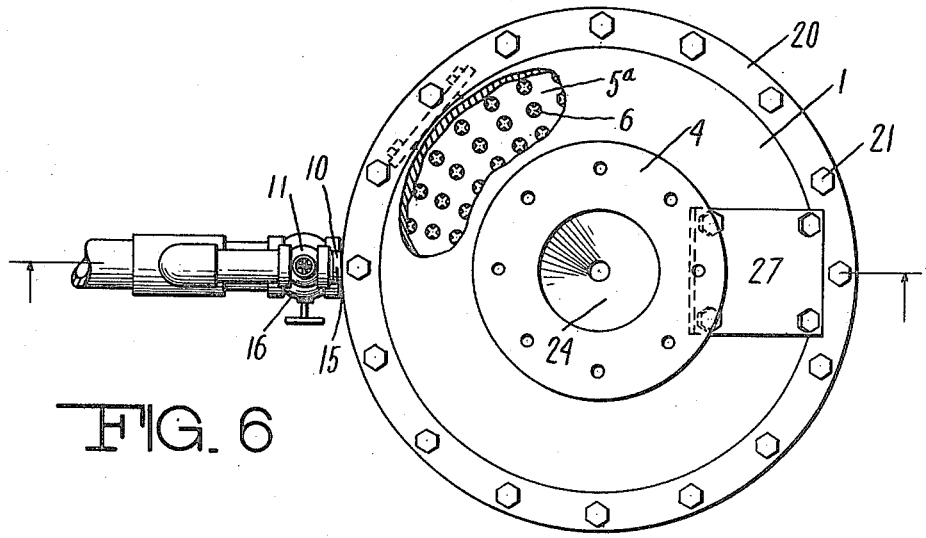
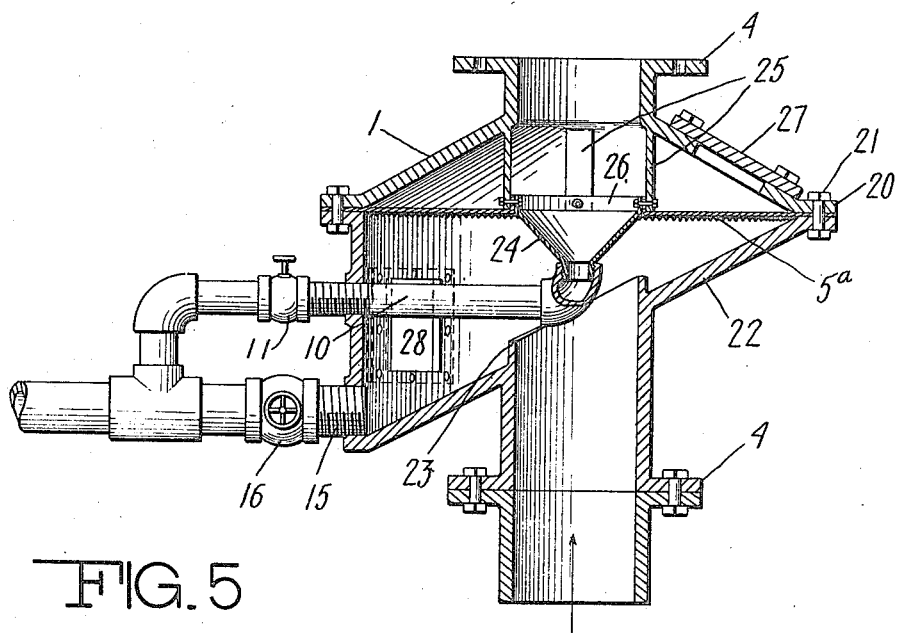

UNITED STATES PATENT OFFICE.

GUSTAVUS T. BUXTON AND SIMEON A. ABBEY, OF CHARLOTTE, NORTH CAROLINA.

FILTRATION DEVICE FOR FLUID-DISTRIBUTING SYSTEMS.

1,226,307.   Specification of Letters Patent.   Patented May 15, 1917.

Application filed July 23, 1915. Serial No. 41,472.

*To all whom it may concern:*

Be it known that we, GUSTAVUS T. BUXTON and SIMEON A. ABBEY, citizens of the United States, residing in Charlotte, in the county of Mecklenburg and State of North Carolina, have invented certain new and useful Improvements in Filtration Devices for Fluid-Distributing Systems, of which the following, taken in connection with the accompanying sheets of drawings, is a full, clear, and concise description.

Our present invention relates to an improved form of filter screen and housing therefor, particularly adaptable for use in the main supply pipes, or risers, of automatic sprinkler or like systems. The object of the invention is to safeguard the sprinkler system against the collection of foreign substances, such as gravel, cinders, mud, slag, etc.

In the accompanying drawings we have illustrated several embodiments of our invention to show the manner in which the same may be usefully employed, and in which,—

Figure 1 is a top plan view of a vertical filter embodying one form of our invention, in which the screen cylinder is arranged vertically, and in which the fluid flow is in an upward direction.

Fig. 2 is a view in side elevation thereof, taken on line *a—a* of Fig. 1, a part of which is shown in vertical section.

Fig. 3 is a similar view of another form or embodiment of the invention adaptable for use in connection with a vertically-arranged pipe through which the fluid flows in a downward direction.

Fig. 4 is a fragmentary detail of a portion of the filter screen showing the manner in which the openings therethrough are guarded to prevent their obstruction or the entrance of foreign substances to the system.

Fig. 5 is a vertical cross-sectional view of a modification of our invention showing a form of horizontal strainer applied in lieu of the vertically-arranged cylinder strainer of the above figures.

Fig. 6 is a top plan view of the modification shown in Fig. 5.

As mentioned, our filter is inserted in the main pipe or riser supplying the system. In connection with the embodiment illustrated in Fig. 1, the water enters the filter through the bottom orifice flowing up therethrough and after being filtered is distributed through the system. During its passage through the filter the more solid substances, which are not capable of finding their way through the guarded openings in the screen, are arrested and deposited in the device, to be subsequently removed therefrom. The filter comprises a shell or casing 1, having a side opening covered by a removable plate or door 2, whereby access may be conveniently had to the interior by the removal of retaining bolts 3. The shell is provided with end flanges 4 adapted to connect with the flanged ends of the main supply pipes in which the filter is to be inserted. The interior diameter of the filter is preferably twice the size of the fluid supply pipe leading to the system which is to be protected. Disposed centrally within the shell or casing is arranged a filter screen which may take the form of a vertical cylinder, 5, in Figs. 2 and 3, or a flat circular longitudinally-arranged screen 5ª in Fig. 5. This filter screen is provided with perforations or apertures 6 throughout the major portion of its body, these apertures being guarded by a plurality of outwardly-extending fingers or projections 7, which are preferably stamped from the metal of which the screen is made and, preferably, each of the fingers is of a length corresponding to half the diameter of the aperture which it guards. As explained, these guard fingers extend outwardly in contrary direction to the flow of the fluid through the aperture, and are for the purpose of protecting and shielding the system from such solids as may be carried by the fluid supply that are not able to pass through the restricted openings or apertures. A particular advantage of having these guard fingers extend outwardly opposite to the direction of the incoming fluid is that they render it impossible for substances to become wedged in the apertures, which might be the case if the guard fingers extended inwardly, that is, in the direction of the flow. By reason of the particular arrangement and shape of guard fingers, substances which might be arrested thereby will not necessarily obstruct the inward flow of fluid, as such substances will be arrested and held removed from the body proper of the screen, while the fluid flows around and through the remaining space beneath, between the adjacent guard fingers. Particular mention is made of this improved form of guarded aperture, as it forms and constitutes an important feature of our invention. The perforated screen is preferably made of brass and is of a diameter slightly in excess of that of the pipe or fluid inlet, and is of such length and possesses sufficient guarded apertures to afford in the aggregate an area of at least four times that of the fluid inlet pipe.

In embodying the invention in a filter which is designed to protect a system where the flow in the entrance pipe is in an upward direction, the cylindrical filter screen and containing shell is preferably made in accordance with the illustration of Fig. 2, in which the filter screen 5 is supported vertically and centrally within the casing 1, the upper or open end thereof being fastened by any suitable means to an annular depending ring or lip 8, while the lower end terminates in, or is connected with, a coniform or funnel-shaped member 9, the latter constituting or serving the purpose of a mud pocket. An opening is provided at the apex of the funnel-shaped mud pocket to which is connected an outlet or drain pipe 10, controlled by a suitable valve 11. Any suitable connecting means may be employed for connecting the mud-pocket with the drain outlet pipe. In order to add rigidity and support at the lower end of the filter screen, cast lugs are provided in the center of the back of the shell and the center of the removable cover, such as shown at 12 in Fig. 2. These lugs engage the filter screen just beneath the top edge of the funnel-shaped end thereof. The lower end of the casing or housing 1 is provided with an interior inclined bottom 13 and an annular flange 14, the top edge of which is similarly inclined, providing or forming a deposit channel or groove circumferentially around the inside of the chamber and outside of the entrance inlet thereto. At the lowest point of this channel or groove the shell 1 is provided with an aperture to which is connected an outlet drain pipe 15, which is controlled by a suitable valve 16. The outlet drain pipes 10 and 15 may both be connected to a common outlet, as shown.

Where the filter is employed to protect a downward flow, the screen is inverted as shown in Fig. 3. In this form the top of the filter is closed and is provided with a tapered top 17. The lower opening of the filter is supported upon a circumferentially-arranged upwardly projecting wall 18, which also serves to form the wall of the deposit channel or groove heretofore referred to. The upper end of the filter screen is supported in proper position by a plurality of inwardly-projecting lugs 19 formed on the shell 1 and the door 2.

We may, where found desirable, substitute for a cylindrical filter screen a horizontally-arranged filter screen as shown at $5^a$, in Fig. 5. When so doing, we preferably change the shape of the containing chamber to that shown in said Fig. 5. The screen here is supported in position between projecting flanges 20 of the two-part casing illustrated by securing bolts 21 arranged circumferentially thereof for the purpose. The bottom 22 of the casing here illustrated is inclined and the incoming pipe is provided with an annular projection 23. In this form of apparatus a coniform or funnel-shaped sediment depositing pocket 24 is employed to which may be connected the drain pipe 10 while the drain pipe 15 may also be connected at the lower end of the device so as to take care of the deposits therein. The funnel-shaped mud-pocket and screen are supported centrally of the apparatus by suitable depending arms 25 and collar 26, the former of which may, if desired, be cast integral with the casing 1. In this form of apparatus, suitable openings protected by doors 27 and 28 are provided to afford access to both sides of the filter screen for inspection or other purposes.

The incoming flow is in the direction of the arrow and the earthy materials or solids that are carried thereby are trapped and separated therefrom so that the same may enter the system in as purified a state as possible. It will be understood that the speed of the flow, as it enters the filter, slackens, owing to the fact that its area is larger than the inlet pipe and, consequently, there exists a tendency of the solids to separate and descend by gravity into the groove at the bottom of the apparatus. If the flow, however, is of sufficient speed to lift the materials that are heavier than the fluid against the guards, they will there be arrested and held, leaving the apertures between the guard fingers open. When the pressure occasioned by the flow slackens, the solids will drop by gravity into the groove or channel and be there retained until the valve connecting the drain pipe is opened, when they will be expelled by the rush of water therethrough.

It will be understood that ordinarily most of such obstacles will be deposited in this groove without coming in contact with the filter screen, as the groove affords a recess into which they may drop immediately upon entrance.

Most of the material in solution with the water will be carried through the filter screen into the pipe. After the water becomes stationary upon the filling of the pipes, this material precipitates and causes a slight deposit of sediment therein. The funnel, or mud-pocket, provided will collect a considerable portion of this as the area contained in the large vertical pipe with which it is usually connected, forms a large percentage of the entire pipe area of the system.

When it is desired to clean the filter, all that is necessary to do is to open the valves 11 and 16 controlling the drains in the bottom of the inclined channel, and the bottom of the mud-pocket. In this manner the water-pressure from above will eject the same from the filter.

By shutting off the fluid supply and opening the valve 15 of the drain pipe 16, the water from the system above will pass down through the filter screen and be discharged. This outward flow will tend to throw off any obstruction which may have lodged or been caught by the screen guards, thus ejecting the same from the system. It is understood that in the event of the drain from the inclined channel at the bottom of the device or mud-pocket failing to clear when the controlling valves of the drains are opened, access to the interior of the device may be readily had by removing the door or cover 2. Likewise, should it be desired to repair or remove the screen, this may be done through the openings provided for the purpose. By the employment of our invention a testing for sediment is made extremely convenient.

Having thus described our invention what we claim as new herein and desire to secure by Letters Patent is:—

1. In a filter of the character described, the combination of a casing, a filter screen therein, depositories beneath said screen, one to receive substances that have not passed through the filter, the other to receive substances that have passed therethrough, and drains for said depositories, substantially as described.

2. In a filter, the combination of a casing, a filter screen located therein, a valve controlled outlet at the bottom of said filter screen and a valve controlled outlet at the bottom of the casing.

3. In a filter of the character described, the combination of a casing, a filter screen suspended concentrically therein, the lower extremity of said filter screen being provided with a discharge outlet leading exterior to the casing, an inclined depository at the lower extremity of said casing and a valve controlled communicating pipe leading therefrom to a point exterior of the casing.

GUSTAVUS T. BUXTON.
SIMEON A. ABBEY.